United States Patent Office 3,429,884
Patented Feb. 25, 1969

3,429,884
NOVEL QUINOLIZIDINE DERIVATIVES OR SALTS THEREOF AND PROCESS FOR PREPARING THE SAME
Ichiro Matsuo, Kawasaki-shi, and Sadao Ohki, Tokyo, Japan, assignors to Chugai Seiyaku Kabushiki Kaisha, Tokyo, Japan, a corporation of Japan
No Drawing. Filed Mar. 31, 1965, Ser. No. 444,368
Claims priority, application Japan, Mar. 31, 1964, 39/17,661
U.S. Cl. 260—293   9 Claims
Int. Cl. C07d 29/02; A61k 27/00

ABSTRACT OF THE DISCLOSURE

The compounds of the class of 3-halobenzylquinolizidine and salts thereof having oxytocic, antihistaminic, antiacetylcholine and antibarium activity are prepared by reacting a metal salt of 3-carboalkoxy-4-ketoquinolizidine with a halobenzylhalide, reacting the formed 3-carboalkoxy-3-halobenzyl-4-ketoquinolizidine with a mineral acid, heating and closing the ring of the produced α-halobenzyl-γ-(2-piperidyl)-butyric acid to afford 3-halobenzyl-4-ketoquinolizidine and reducing this material.

This invention relates to the novel quinolizidine derivatives or salts thereof represented by the general formula:

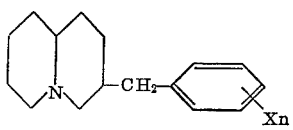

wherein $X_n$ represents one or more halogen atoms, and process for the preparation thereof.

The novel compounds prepared in accordance with this invention are of value as excellent drugs.

More specifically, the compounds of this invention have valuable pharmacological activities, such as oxytocic, antihistaminic, antiacetylcholine or antibarium activity more particularly stronger oxytocic activity, compared with the known sparteines and a degree of toxicity thereof is ⅓ as much as the latter and are therefore suitable for a continuous use during extended period.

According to the invention, the novel quinolizidine derivative (VI) can be obtained by reacting a metallic salt (I) of 3-carboalkoxy-4-ketoquinolizidine with halogen substituted benzylhalide (II), deesterifying and decarboxylating the thus formed 3-carboalkoxy-3-(halogen substituted-benzyl)-4-ketoquinolizidine (III) to form 3-(halogen substituted-benzyl)-4-ketoquinolizidine (V) and then reducing the resultant product.

The reaction systems according to the invention are set out in the following formulae:

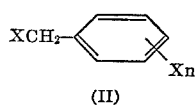

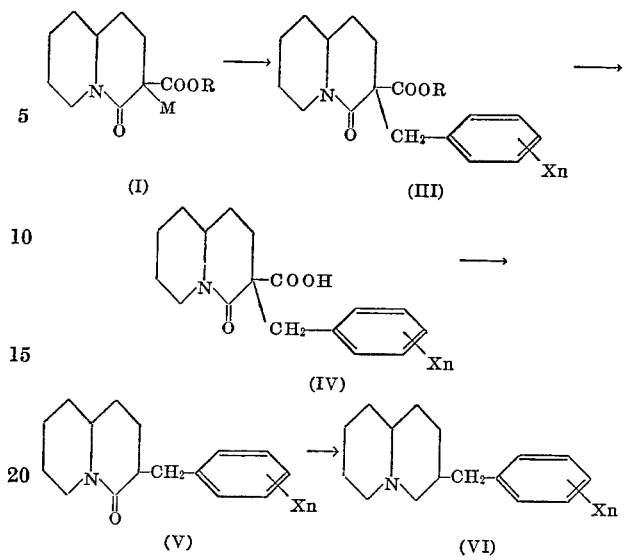

wherein M designates metallic atom, R represents alkyl group and $X_n$ is the same as mentioned above.

Alternatively in order to prepare the compound V by deesterifying and decarboxylating the compound III, the latter may be reacted with a mineral acid to form α-(halogen substituted-benzyl)-γ-(2-piperidyl)-butyric acid with the ring cleavage which is heated to close the ring after the esterification according to the reaction systems shown in the following formulae:

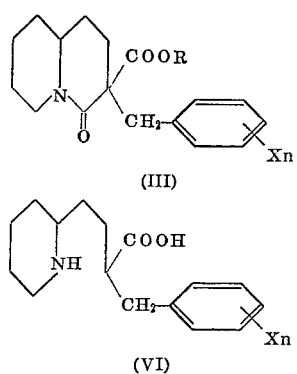

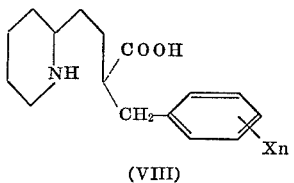

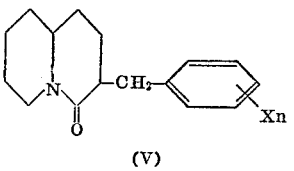

wherein R and $X_n$ are the same as given above.

The invention will be more fully understood from the following description, in which all the symbols are as given in any of the cases set forth above.

The compound I is first prepared by substituting an active hydrogen in the 3 position of 3-carboalkoxy-4-ketoquinolizidine with a metal for example reacting 3-carboalkoxy-4-ketoquinolizidine with the metal in organic solvent. The compound I is then reacted with the compound II in the organic solvent for example such as benzene, toluene, xylene etc. preferably in the form of alkali metallic salt or silver salt. Alternatively, the reaction may be carried out by adding the compound II to the solution containing the compound I which is obtained by reacting 3-carboalkoxy-4-ketoquinolizidine with the metal in the organic solvent. The halogen atom having a bond with methylene group the compound II is rich in a reactivity in such order as fluorine, iodine, bromine and chlorine. A minor quantity of potassium iodide or potassium bromide may be employed as a reaction accelerator.

The metallic halogen compound formed by the above reaction is taken off by the filtration or dissolution into water and then concentrated to give the compound III.

The compound III can be purified by alumina or infusorial earth column chromatography process or the distillation, notwithstanding it is permitted to be employed for the subsequent reaction without the purification.

The deesterification of the compound III takes place with the known process, for example, by either stirring the compound III in caustic alkali solution at a room temperature for extended period or heating at a reflux for a limited time. During the operation, an alkali salt of the carboxylic acid is formed, which is preferably acidified with acetic acid to give the compound IV. It is advisable to carry out the decarboxylation of the compound IV at 150–170° C. Under this condition, the reaction ceased within from 40 minutes to 2 hours. The formed compound V is extracted with such a suitable solvent as benzene, chloroform etc. washed with water, concentrated and then isolated.

Moreover, a hydrochloric acid is particularly preferable as an acid for preparing the compound VII from the compound III and it is advantageous to reflux the compound III for more than 5 hours by using an excess of the calculated quantity of hydrochloric acid having the concentration of more than 10 percent particularly about 20 percent. The compound VII is obtained by concentration of reaction solution.

The compound VII is esterified by the known process for example by saturating its alcoholic solution with hydrogen chloride gas and heating the saturated solution. The resultant ester is heated to bring a dealcohol-ring-closing reaction, thereby the compound V may be formed. The crude ester usually forms an oily substance and the ring closing reaction takes place by heating the said oily substance preferably at 130–180° C. which is then purified by the distillation or the recrystallization.

The reduction of the thus formed compound V is usually carried out by utilizing the process applicable to the reduction of the carbonyl group. For example, it is particularly advantageous to reduce the compound V in such the suitable solvent as the tetrahydrofurane for example by using lithium-aluminum hydride or to dissolve the compound V in 50% sulfuric acid to ensure an electrolytic reduction. The formed quinolizidine derivative, i.e. 3-(halogen substituted-benzyl)-quinolizidine (VI) is purified by the distillation or recrystallization. From the structure of this compound, a presence of the stereoisomer is anticipated and the melting point at the crystallization is determined by the property of the recrystallization solvent, although an elementary analytical amount coincides with the calculated amount at any of the melting points. According to the conventional process, this 3-(halogen substituted-benzyl)-quinolizidine (VI) forms acids for example, such as hydrochloric acid, tartaric acid, phenolphthalin etc. or alkylhalide such as methyl iodide, methyl bromide etc. and salts thereof.

On the formation of these salts, the stereoisomer is not changed into the different form.

The pharmacological activities and the degree of toxicity of the compound prepared according to the present method is illustrated by way of example with reference to 3-(4'-chlorobenzyl)-quinolizidine, as follows:

This compound has 10 times by weight unit of the oxytocic activity extracted from the rabbit as much as the sparteine sulfate and about 2 to 5 times of the oxytocic activity of the living body compared with the sparteine sulfate, while the degree of toxicity of the sparteine sulfate LD is 117 mg./kg. whereas the present compound has the toxicity of 357 mg./kg.

The following examples illustrate the practical applications of the invention.

Example I

A solution of 70 g. of 3-carbethoxy-4-ketoquinolizidine is dissolved into 500 ml. of dry toluene followed by 7 g. of metallic sodium and reacted under the agitation at 95° C. for 3 hours, and 50 g. of 4-chlorobenzylchloride is dropped by slow degrees into sodium salt solution of the formed clear red 3-carbethoxy-4-ketoquinolizidine with the agitation, whereafter reacted at an inner temperature of 110 to 120° C. for 7 hours. The reaction is promoted when 1 g. of potassium bromide is previously added to the reaction zone. After cooling, the precipitate is dissolved with water and extracted with 20 ml. of the benzene, an organic solvent layer is extracted and concentrated under the reduced pressure to give a residue in the form of the crude 3-carbethoxy-3-(4'-chlorobenzyl)-4-ketoquinolizidine.

The thusly obtained 3-carbethoxy-3-(4'-chlorobenzyl)-4-ketoquinolizidine is dissolved into 700 ml. of 50% methanol which is add with 20 g. of caustic potassium with agitation and refluxed with agitation for 20 hours. Whereafter, a major proportion of the methanol is distilled off to prepare the water liquor while the water layer is extracted with benzene and acidified with glacial acetic acid whereafter extracted with 300 ml. of the benzene. The benzene layer is washed with water so that the benzene is distilled off to give a crude 3-carboxy-3-(4'-chlorobenzyl)-4-ketoquinolizidine which is then heated in an oil bath at 150–170° C. for about one hour to discharge properly the carbon dioxide gas. After the termination of the reaction, the resultant ketoquinolizidine is extracted with 200 ml. of benzene, washed with 10% of sodium hydroxide, washed with water, and concentrated. The residue is distilled under the reduced pressure to give 32.5 g. of 3-(4'-chlorobenzyl)-4-ketoquinolizidine is prepared in the form of a yellow green oil as fraction, B.P. 210–215° C. at 6 mm. Hg. After allowing this oil to stand, it is crystallized and recrystallized from ether to give a colorless laminar crystal having the melting point of 111–113° C.

*Elemental analysis.*—$C_{16}H_{20}ONCl$, percent: Calcd.: C, 69.12; H, 7.25; N, 5.04. Found: C, 69.30; H, 7.12; N, 5.21.

20 g. of 3-(4'-chlorobenzyl)-4-ketoquinolizidine thus formed is dissolved into 200 ml. of anhydrous tetrahydrofurane which is subsequently dropped into a suspension consisting of 3.5 g. of the lithium-aluminium hydride with 200 ml. of the anhydrous tetrahydrofurane with agitation by cooling with water and then refluxed for about 7 hours. To the chilled mixture was added 10% of sodium hydroxide to dissolve an excess of the lithium-aluminium hydride and then extracted with 200 ml. of benzene. The organic solvent layer is taken off, washed with water containing 50% sodium chloride and then dried. After the inspissation, the residue is distilled under the reduced pressure to give 3-(4'-chlorobenzyl)-quinolizidine as a fraction, having the boiling point of 170° C.–180° C. at 5–5.5 mm. After the crystallization the extracts are washed with the equivalent mixed solution of anhydrous ether and petroleum ether and then recrystallized from ether to give 16 g. of crystals having the melting point of 69–71° C.

Elemental analysis.—$C_{16}H_{22}NCl$, percent: Calcd.: C, 73.06; H, 8.43; N, 5.33. Found: C, 72.95; H, 8.36; N, 5.14.

When the recrystallization takes place with mixed liquor of methanol with water, the crystal having the melting point of from 40–55° C. is prepared.

Elemental analysis.—$C_{16}H_{22}NCl$, percent: Calcd.: C, 73.06; H, 8.43; N, 5.33. Found: C, 73.23; H, 8.16; N, 5.43.

Moreover, when the recrystallization takes place with a mixed solution of acetone and water, the crystal having the melting point of from 40 to 55° C. is formed.

Elemental analysis.—$C_{16}H_{22}NCl$, percent: Calcd.: C, 73.06; H, 8.43; N, 5.33. Found: C, 73.14; H, 8.31; N, 5.23.

The various salts can be produced from the formed 3-(4'-chlorobenzyl)-quinolizidine in accordance with the following procedure.

Hydrochloride.—After the saturation of the acetone solution of 3-(4'-chlorobenzyl)-quinolizidine having the melting point of from 69 to 71° C. with the dried hydrogen chloride gas, petroleum ether is added in such a minor quantity as to show a slight turbidity and the mixture is ice-cooled, then the hydrochloride crystallized out. The crystallized hydrochloride is taken off by filtration and recrystallized from a mixed solution of water and petroleum ether to give colorless fine crystal having the melting point of 182° C.

Elemental analysis.—$C_{16}H_{23}NCl_2$, percent: Calcd.: C, 64.05; H, 7.73. Found: C, 64.27; H, 7.56.

Tartrate.—3 - (4' - chlorobenzyl) - quinolizidine is dissolved into a mixed solution of acetone and water in 2:1 and followed by the corresponding equivalent tartaric acid following to heat slightly and thereafter cooling with ice, then the tartrate crystallized out. The crystallized tartrate is filtered off and recrystallized from a mixed solution of water and acetone to give colorless fine crystal having the melting point of from 115 to 118° C.

Elemental analysis. — $C_{20}H_{28}O_6NCl \cdot H_2O$, percent: Calcd.: C, 55.70; H, 7.01; N, 3.25. Found: C, 55.42; H, 7.05; N, 3.27.

Methiodide.—3-(4'-chlorobenzyl)-quinolizidine having the melting point of from 69 to 71° C. is reacted with an excess of methyl iodide in the methanol at a slightly elevated temperature. After which the reaction mixture is rcrystallized from a mixed solution of ethanol and ether to give the colorless laminar crystal having the melting point of 189–191° C.

Elemental analysis.—$C_{17}H_{25}NCl$, percent: Calcd.: C, 50.29; H, 6.21; N, 3.45. Found: C, 50.16; H, 6.42; N, 3.67.

Phenolphthalinate.—3-(4'-chlorobenzyl) - quinolizidine having the melting point of from 69 to 71° C. is reacted with the equivalent quantity of phenolnaphthaline

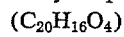

in the acetone at a slightly elevated temperature. The glutinous substance is crystallized in anhydrous ether to give the fine crystal having the melting point of from 159 to 162° C.

Elemental analysis.—$C_{36}H_{38}O_4NCl$, percent: Calcd.: C, 74.16; H, 6.57; N, 2.39. Found: C, 74.29; H, 6.21; N, 2.46.

Picrate.—1.8 g. of 3-(4'-chlorobenzyl) - quinolizidine having the melting point of 67–71° C. is dissolved into 100 ml. of ethanol followed by 1.8 g. of picric acid and heated for a certain period allowing to stand on cooling. When an inner temperature of the liquor comes to about 30° C., the separated crystal is filtered off to prepare crude picrate (2.2 g.) having the melting point of 168–189° C. which is then recrystallized from glacial acetic acid to give picrate (1.6 g.) having the melting point of 198–199° C.

On the other hand, the filtrate is concentrated to ½ amount and allowed to stand in an ice room, whereafter the separated crystal is removed by filtration to form crude picrate (0.5 g.) having the melting point of 159–163° C. which is then recrystallized from ethanol to give 0.3 g. of picrate having the melting point of 163–165° C.

Elemental analysis.—$C_{22}H_{23}O_7N_4Cl$, percent: Calcd.: C, 53.64; H, 5.07; N, 11.37. Found: (M.P. 198–199° C.): C, 53,58; H, 5.15; N, 11.47; (M.P. 163–165° C.): C, 53, 67; H, 5.11; N, 11.56.

Each of the formed picrate is suspended respectively in 10% potassium hydroxide solution and heated for a certain period to give clear red solution. The resultant solution is extracted with benzene under salting out with potassium carbonate, after which benzene layer is washed with water and concentrated after dried over sodium sulfate to give 3-(4'-chlorobenzyl)-quinolizidine of melting point 73° C. from the picrate having the melting point of 198–199° C. and of melting point of 60° C. from the picrate having the melting point of 198 to 199° C. with the yield of about 90% respectively.

Elemental analysis.—$C_{16}H_{22}NCl$, percent: Calcd.: C, 72.83; H, 8.41; N, 5.31. Found: (M.P. 73° C.): C, 72.85; H, 8.35; N, 5.44; (M.P. 60° C.): C, 72.78; H, 8.49; N, 5.35.

After heating thus formed each of 3-(4'-chlorobenzyl)-quinolizidine in ethanol solvent with an excess of methyl iodide at a slightly elevated temperature for one hour, ethanol is distilled off and the residue is recrystallized to give estimated quantity of methyl iodide salt.

The compound obtainable from 3-(4'-chlorobenzyl)-quinolizidine having the melting point of 73° C. is colorless fine crystal (recrystallization from ethanol-acetone) is having the melting point of 211° C., while the compound obtainable from 3-(4'-chlorobenzyl)-quinolizidine having the melting point of 60° C. is colorless laminar crystal having the melting point of 205–207° C. (recrystallization from acetone).

Elemental analysis.—$C_{17}H_{25}NCl1$, percent: Calcd.: C, 50,29; H, 6.21; N, 3.54. Found: (M.P. 211° C.): C, 50.40; H, 6.27; N, 3.32; (M.P. 205–207° C.): C, 50.51; H, 6.42; N, 3.29.

Example II

In the same operation as described in Example I by employing, 2-chlorobenzylchloride instead of 4-chlorobenzylchloride in Example I, 3-(2-chlorobenzyl)-4-keto-quinolizidine is obtained in the form of the colorless cubic crystal having the melting point of 100 to 106° C. Yield is 60%.

Elemental analysis.—$C_{16}H_{20}ONCl$, percent: Calcd.: C, 69.12; H, 7.25; N, 5.04. Found: C, 69.33; H, 7.18; N, 5.09.

The 27.8 g. of 3-(2-chlorobenzyl)-4-ketoquinolizidine thus formed is dissolved into 50% sulfuric acid to be employed as anolyte while 50% sulfuric acid is employed as catholyte. The catholyte and anolyte are then subjected to an electric reduction with the purified lead plate under the current density of 0.2–0.3 amp/cm.$^2$ at 20–30° C. for 6 hours and further under 0.3–0.4 amp/cm.$^2$ for one hour. The anolyte is treated with the sodium carbonate to prepare an alkaline oil which is then extracted with benzene. Whereafter, the benzene layer is washed with water, dried, concentrated and then distilled under the reduced pressure to give 3-(2'-chlorobenzyl)-quinolizidine as the fraction having the boiling point of 145–155° C. at 4–4.5 mm. Hg. Yield is 70% against 3-(2'-chlorobenzyl)-4-ketoquinolizidine.

Elemental analysis.—$C_{16}H_{22}NCl$, percent: Calcd.: C, 73.06; H, 8.43; N, 5.33. Found: C, 73.17; H, 8.30; N, 5.29.

Hydrochloride: The extracts are recrystallized with a mixed solution of ethanol and ethyl acetate to give colorless laminar crystal having the melting point 238–239° C.

Elemental analysis.—$C_{16}H_{23}NCl_2$, percent: Calcd.: C, 64.05; H, 7.73. Found: C, 64.11; H, 7.53.

Example III

In the same operation as described in Example I, by employing 3,4-dichlorobenzylchloride instead of 4-chlorobenzylchloride in Example I, 3-(3',4'-dichlorobenzyl)-4-ketoquinolizidine is prepared in the form of colorless cubic crystal having the melting point of from 95 to 97° C. Yield is 58%.

Elemental analysis.—$C_{16}H_{19}ONCl_2$, percent: Calcd.: C, 61.59; H, 6.14; N, 4.49. Found: C, 61.89; H, 6.21; N, 4.57.

The formed 3-(3',4'-dichlorobenzyl)-4-ketoquinolizidine is reduced in the same manner as described in Example I to give 3-(3',4'-dichlorobenzyl)-quinolizidine as the fraction having the boiling point of 182–192° C. at 4 mm. Hg. Yield is 68% against 3-(3',4'-dichlorobenzyl)-4-ketoquinolizidine.

Elemental analysis.—$C_{16}H_{21}NCl_2$, percent: Calcd.: C, 64.48; H, 7.10; N, 4.70. Found: C, 64.70; H, 7.35; N, 4.50.

Hydrochloride.—Recrystallized from a mixed solution of ethyl acetate and petroleum ether to give colorless fine crystal having the melting point of 158–162° C.

Elemental analysis.—$C_{16}H_{22}NCl_3$, percent: Calcd.: C, 57.36; H, 6.62. Found: C, 57.19; H, 6.57.

Picrate.—Recrystallized from a mixed solution of acetic acid and ethanol to give the colorless laminar crystal having the melting point of 168° C.

Elemental analysis.—$C_{22}H_{24}O_7N_4Cl_2$, percent: Calcd.: C, 50.14; H, 4.59. Found: C, 50.42; H, 4.53.

Example IV

To 35 g. of 3-carbethoxy-3-(4'-chlorobenzyl)-4-ketoquinolizidine prepared in the same manner as set forth in Example I is added 250 ml. of 20% hydrochloric acid and refluxed on the oil bath at 140° C. for 5 hours, thereafter concentrated under the reduced pressure. The residual yellow glutinous substance is washed with a small amount of ether and thereafter dissolved in acetone under heating. After cooling the solution is added with ether and cooled with ice, then the hydrochloride of α-(4'-chlorobenzyl)-γ-(2-piperidyl)-butyric acid crystallizes out. The resultant crystal is filtered off and recrystallized from a mixed solution of acetone and ether to give 23.1 g. of colorless fine crystal having the melting point of 207° C.

Elemental analysis.—$C_{16}H_{23}O_2NCl_2$, percent: Calcd.: C, 57.88; H, 6.98; N, 4.22. Found: C, 57.80; H, 6.70; N, 4.31.

20 g. of hydrochloride of α-(4'-chlorobenzyl)-γ-(2-piperidyl)-butyric acid is dissolved into 300 ml. of anhydrous methanol and hydrogen chloride gas is saturated under ice-cooling and thereafter allowed to stand for one night and subsequently refluxed for 4 hours. The solvent is distilled off to form a yellow glutinous substance which is dissolved into the acetone by heating and added with ether to give 16 g. of α-(4'-chlorobenzyl)-γ-2-piperidyl)-methylbutyrate in the form of colorless cubic crystal having the melting point of from 93° C. to 94° C.

Elemental analysis.—$C_{17}H_{25}O_2NCl_2$, percent: Calcd.: C, 59.01; H, 7.28; N, 4.05. Found: C, 58.87; H, 7.20; N, 4.25.

This α-(4'-chlorobenzyl)-γ-(2-piperidyl)-methyl butyrate is dissolved into a small amount of water and added with sodium carbonate to have alkaline nature, whilst the formed oil is extracted with benzene and the benzene layer is washed with water and then concentrated. The residue is heated at 150–170° C. to close ring by distilling out of methanol, after which distilled under the reduced pressure to give 3-(4'-chlorobenzyl)-4-ketoquinolizidine as the fraction having the boiling point of 210–215° C. at 6 mm. Hg with yield of from 55 to 62%.

This oil is, after being allowed to stand, crystallized and then recrystallized with ether to give colorless laminar crystal having the melting point of 111–113° C.

Elemental analysis.—$C_{16}H_{20}ONCl$, percent: Calcd.: C, 69.12; H, 7.25; N, 5.04. Found: C, 69.21; H, 7.47; N, 5.12.

In the same operation as described above using 2-chlorobenzylchloride or 3,4-dichlorobenzylchloride instead of 4-chlorobenzylchloride, the products equivalent to those prepared in Example 2 or 3 are obtained.

The prepared 3-halogen substituted benzyl-4-ketoquinolizidine may be converted to the desired products by the reductions in the same manner as described in Example I or II.

We claim:

1. A quinolizidine derivative having the following formula:

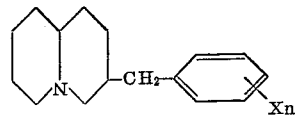

or a salt thereof, in which X$n$ represents one or two chlorine atoms, and the pharmaceutically acceptable acid addition salts thereof.

2. 3-(4'-chlorobenzyl)-quinolizidine.
3. 3-(2'-chlorobenzyl)-quinolizidine.
4. 3-(3',4'-dichlorobenzyl)-quinolizidine.
5. Hydrochloric salt of 3-(4'-chlorobenzyl)-quinolizidine.
6. 3-(4'-chlorobenzyl)-quinolizidine tartrate.
7. 3-(4'-chlorobenzyl)-quinolizidine phenol-phthalinate.
8. Hydrochloric salt of 3-(3',4'-dichlorobenzyl)-quinolizidine.
9. A method which comprises reacting a metallic salt of 3-carboalkoxy-4-ketoquinolizidine with a chloro substituted benzylhalide, reacting the formed 3-carboalkoxy-3-(chloro substituted-benzyl)-4-ketoquinolizidine with a mineral acid to prepare α-(chloro substituted-benzyl)-γ-(2-piperidyl)-butyric acid, heating and closing the ring after the esterification to form 3-(chloro substituted-benzyl)-4-ketoquinolizidine and then reducing the resultant product.

References Cited

Matrio, J. of Pharmaceutical Soc. of Japan, Vol. 81, 1083–9 (1961).

Chemical Absts., Vol. 56, cols. 5931–5933 (1962).

JAMES A. PATTEN, Primary Examiner.

U.S. Cl. X.R.

260—294, 294.3, 294.7; 424—267